United States Patent
Valente

[15] 3,663,076
[45] May 16, 1972

[54] GLAND SEAL ASSEMBLIES

[72] Inventor: Peter Reginald Valente, London, England
[73] Assignee: Hallite Holdings Limited, Middlesex, England
[22] Filed: Mar. 9, 1971
[21] Appl. No.: 122,474

[30] Foreign Application Priority Data

Apr. 1, 1970    Great Britain.................1,543,670/70

[52] U.S. Cl...............................308/36.1, 92/206, 92/250, 277/120, 277/145, 277/190
[51] Int. Cl. .....................................F16c 33/78, F16j 15/24
[58] Field of Search ..................308/36.1; 92/206, 207, 250, 92/168; 277/216, 117, 118, 119, 120, 121, 144, 145, 190

[56] References Cited

UNITED STATES PATENTS

| | | | |
|---|---|---|---|
| 2,034,227 | 3/1936 | Colwell et al. | 308/36.1 |
| 2,931,671 | 4/1960 | Beeley | 277/120 |
| 3,227,464 | 1/1966 | Makin | 277/120 |
| 1,487,630 | 3/1924 | Walsh | 277/145 |
| 1,175,383 | 3/1916 | Shephard | 277/190 |
| 2,279,238 | 4/1942 | Larson | 92/206 |
| 3,068,054 | 12/1962 | Schmidt et al. | 92/250 |
| 878,186 | 2/1908 | Byrnes et al. | 277/216 |

Primary Examiner—Martin P. Schwadron
Assistant Examiner—Barry Grossman
Attorney—Larson, Taylor and Hinds

[57] ABSTRACT

A gland seal assembly is made up of three rings arranged side-by-side. The two outer rings are hard but the intermediate one is elastomeric. At one radial periphery (either inner or outer) the rings have abutting planar faces so that axial moving together of the hard rings compresses part of the intermediate ring between them. This part, bounded by the planar faces, is, in its uncompressed state, of a peripheral radius different from that of the hard rings so that it is set back from them but when axial compression is applied to it it is squeezed so that it projects radially and effects the desired sealing effect. This part of the intermediate ring is narrower then the remainder of the ring so that the peripheral radius of the remainder part is less affected by the compression.

10 Claims, 4 Drawing Figures

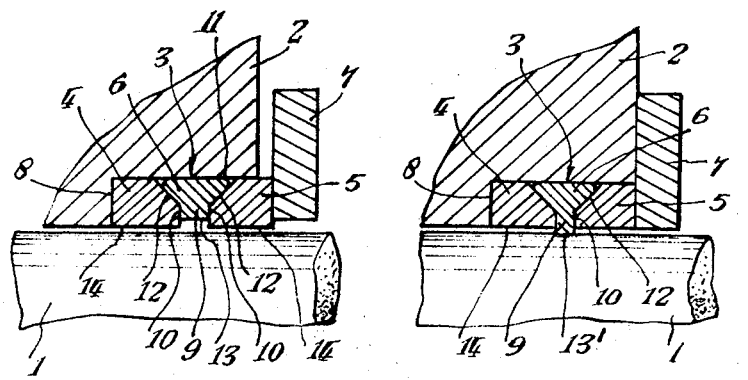
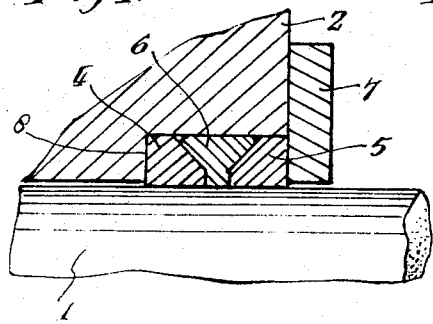
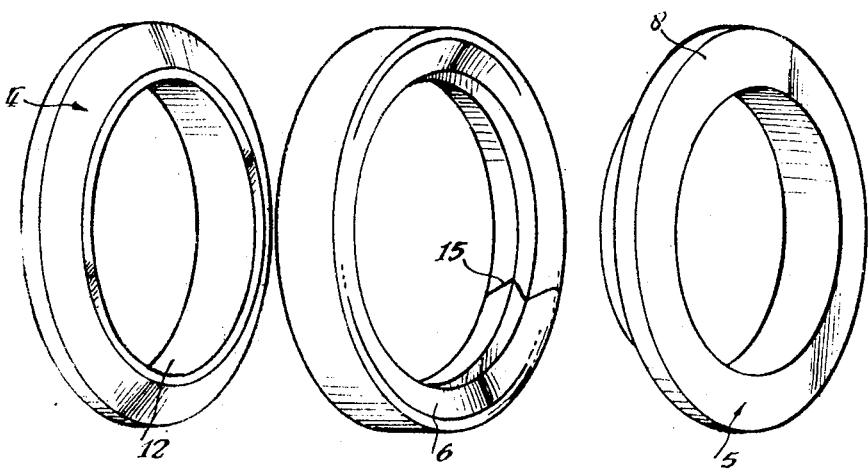

3,663,076

GLAND SEAL ASSEMBLIES

BACKGROUND OF THE INVENTION

This invention relates to gland seal assemblies. These are provided to give a fluid seal between where a relatively movable part, such as a member like a shaft passes through an aperture. The shaft may also or alternatively execute some rotary motion relative to the aperture.

A particular object of the invention is to provide a gland seal assembly which is comparatively readily replaceable without substantial dismantling of the machine in which it is found. For example, a hydraulic ram fitted to earth-moving equipment may occasionally need replacement of this seal, and time during which this equipment is kept out of operation is very expensive.

In order to allow for the ready insertion of a replacement sealing ring in these assemblies, the sealing rings have previously been split. Once the old ring was removed a new one could be slipped over the shaft due to its split and then be placed into the housing provided. However, these previous rings were always designed to be an interference fit with the two parts between which they were sealing. Because of this they were difficult to insert and when inserted there tended to be a misalignment or false overlap of the split surfaces due to the peripheral (tangential) compression to which the ring was subjected. This caused particular difficulty in multi-component assemblies, such as chevron packing assemblies. Further if the potential leak path offered by the split is left open, leakage through that path will cause the further urging apart of the faces of the split. To prevent that, mechanical end loading has been applied to compress the gland sealing ring or rings in the axial direction. However, this has had the effect of extending them slightly in the radial direction so there has been an increased radial pressure upon the working surface. This in turn causes increased friction and wear and may indeed cause total failure due to the Joule effect, if local overheating occurs.

SUMMARY OF THE INVENTION

We have found that an effective gland seal assembly with a split sealing ring may be made by forming the sealing ring so that in its uncompressed state it is clear of the working surface, and providing that axial pressure can be exerted upon it in a particular position to bring it to a sealing dimension and to close a split in the ring.

This axial pressure is exerted by planer faces of hard end rings, which faces about planar faces of part of the sealing ring. This part has a peripheral radius such that it is usually clear of the working surface for which it is intended, and has a lesser axial thickness than the remainder of the ring. Thus when the assembly is compressed, a particularly high radial alteration is effected on the narrow, planer faced, part of the sealing ring and it is forced into contact with its working surface. However, the remainder of this ring is subjected to comparatively little radial alteration because it is axially wider and because, preferably, it is bounded by divergent frusto-conical faces of its own and of the hard rings, which faces minimize any radial effect on that part of the sealing ring.

To carry out the object stated above, namely ease of replacement of the sealing ring in a gland assembly, the sealing ring will be split. It may either be formed initially as a split ring or may be sent out from the factory as a whole ring and be split on site. A preferable cut for performing this split is a single straight cut made in a plane which is at an angle of 45° to the axial plane.

The said planar abutting faces of the three rings preferably occupy approximately half the radial thickness of the rings, the wider portion of the sealing ring being led to by a pair of frusto-conical surfaces of which the angle of conicity is approximately 45°. Preferably the axially narrower peripheral surface of the sealing ring is the radically inner surface.

SHORT DESCRIPTION OF THE DRAWINGS

FIGS. 1 and 2 show in section on one radius only, exaggeratedly and schematically, the mode of operation of the embodiment, FIG. 3 shows more realistically the state of the embodiment when in actual working condition, and, FIG. 4 is a perspective view of the gland seal assembly in exploded condition.

DESCRIPTION OF A PREFERRED EMBODIMENT.

In FIGS. 1 and 2 there is shown a movable member 1 which is to be reciprocable in a bearing member 2 (for example, a shaft reciprocable through the end plate of a cylinder). The shaft may also or alternatively be rotatable in that bearing member. Inset into a recess 8 in the member 2 is a gland seal assembly 3 which is made up of three rings lying axially side-by-side and in contact with each other. There are two hard outer rings 4 and 5 and an intermediate sealing ring 6 between them. Ring 6 is made of elastomeric material, for example, nitrile rubber, polyurethane, neoprene, fluorocarbon or ethylene propylene, while the end rings 4 and 5 are hard, being made of a material such as steel, cast iron, brass, nylon acetal resin fabric-reinforced rubber or phenolic resin. The natural axial length of the assembly 3 is greater than the actual axial length of the recess 8 into which it fits (FIG. 1) and means are provided, for example, a cover plate 7 which can be screwed onto the member 2, whereby this gland seal assembly can be axially compressed (FIGS. 2 and 3).

The conformation of the sealing ring 6 is that it has a portion 9 adjacent one of its peripheries which is bounded by planar side faces 10 and is narrower in the axial direction than its other peripheral face 11. The planar side faces 10 merge into frusto-conical side face portions 12 of which the preferred angle of conicity is 45°. In this case the narrower peripheral surface 13 of the sealing ring is the radially inner surface and this is, when the ring is uncompressed, of a radius which is greater than the radius of the corresponding inner peripheral surfaces 14 of the rings 4 and 5. Thus this surface of the sealing ring is set back from those corresponding surfaces. The rings 4 and 5 have planar and frusto-conical end faces corresponding to those of the sealing rings. When axial compression is applied, as is shown in FIGS. 2 and 3, the narrow portion 9 of the sealing ring 6 is placed under axial compression and is squeezed radially so that its peripheral surface 13' protrudes to be flush with or proud of the corresponding surfaces 14 of the end rings 4 and 5. The same axial compression is applied over the whole of the ring (the adjacent faces of the rings 4, 5 and 6 being in contact overall) but the effective radial expansion is much less in the outer peripheral face 11 of the ring 6 due to its greater length in the axial direction.

Thus, the sealing ring 6 may be made with its outer wider face 11 substantially an interference fit with the housing which is to receive it while its inner narrower face 13 is oversize.

The inner and outer faces of the rings 4 and 5 may be just a clearance fit between the housing and the shaft. A situation closer to the actual one is shown in FIG. 3, the amount of difference between the radii of surfaces 13' and 14 having been exaggerated in FIG. 2.

The assembly may of course be housed so as to seal at a surface radially outward of itself. Then the outer radius of the sealing ring will be undersize, and will be increased by axial compression.

In a replacement of a worn sealing ring of such an assembly at least the replacement sealing ring 6 is split either by being split in the factory before being sent out or be being split on site (although a clean cut with accurate equipment will be needed). The split is effected by any cut through its thickness which has some tangential component i.e. is in a skew to the axial plane and a preferred cut 15 is a single one made in a plane at 45° to the axial although joggled or saw-tooth cut may be made. Replacement may be made by removing the compression plate 7 and the outer end ring 5, which are slid away up the shaft and can remain on the shaft. The worn ring 6 is removed with a suitable extracting tool and cut off from round the shaft. The new split replacement ring 6 is slipped over the shaft and pushed into position against the end ring 4. Removal of the shaft is not needed. Because it is not an interference fit between the housing and shaft when it is in its uncompressed condition the fitting of the ring 6 can be done comparatively easily and the end faces of the split will come naturally into good register. The ring 5 is then replaced and the plate 7 tightened so that axial compression is applied. This has the double effect of closing the gap which occurs in the split and radially moving the sealing ring, primarily at its narrower peripheral surface but also slightly at its wider peripheral surface, so that effective sealing is set up.

FIG. 4 shows a perspective and exploded view of a gland seal assembly of three rings which, per se, embodies one aspect of the present invention.

The amount of axial compression to be applied and the amount of clearance provided on the set-back surface of the sealing ring is now empirically so that the radial sealing pressure applied by the sealing ring can be calculated to avoid the harmful effects of local overheating or ordinary frictional wear which were mentioned earlier.

The sealing ring and the hard rings may, particularly when the hard rings are of fabric-reinforced rubber, be bonded together to form a unitary gland seal assembly.

I claim:

1. A gland seal assembly having at least three coaxialy arranged rings having a radially outer and a radially inner periphery, there being two hard rings, an intermediate ring axially between them, the intermediate ring being elastomeric, each hard ring having a planer axial end face adjacent one said radial periphery and the intermediate ring having two axial end faces adjacent the corresponding said radial periphery, the said radial periphery of the intermediate ring being different from the said radial periphery of each hard ring so that the said radial periphery of the intermediate ring is set back from that of the hard rings, the axial thickness of the intermediate ring at that said radial periphery being less than its axial thickness at its other radial periphery, and the three rings being adapted for axial juxtaposition with the said planar axial end faces of the intermediate ring in face-to-face contact with the planar axial end faces of the hard rings, respectively.

2. A gland seal assembly according to claim 1 wherein the said planar axial end faces adjacent one periphery of the rings join frusto-conical axial end faces of the respective rings extending to the other periphery of the rings.

3. A gland seal assembly according to claim 2 wherein the planar and frusto-conical faces each extend for about half of the radial thickness of the rings.

4. A gland seal assembly according to claim 1 wherein the angle of conicity is about 45°.

5. A gland seal assembly according to claim 1 wherein the intermediate ring is a split ring, being split by a cut which is in a skew to the axial plane.

6. A gland seal assembly according to claim 6 wherein the cut is in a single plane, which is at an angle of about 45° to the axial plane.

7. A gland seal arrangement between a member movable on an axis and a stationary bearing member, a housing in one of the movable member and the bearing member, at least three coaxially arranged rings housed in the housing, each ring having a radially outer and a radially inner periphery, two of the rings being hard rings, the third being an elastomeric sealing ring, the hard rings being arranged one each axial side of the sealing ring, there being planar end faces of the sealing and of the hard rings adjacent one radial periphery of the rings, the said planar end faces being in abutting relationship, the sealing ring being axially narrower at its part adjacent the said one radial periphery than at its other radial periphery and being normally of a radius at that one periphery different from the radius of the hard rings at that one periphery so that it is set back from the said hard rings at that periphery, and means for applying axial compression to the rings thus housed whereby to press on the said narrower part of the sealing ring by the planar end faces of the hard rings and cause it radially to protrude into working engagement with the other of the movable member and the bearing member.

8. A gland seal assembly according to claim 7 wherein the housing is in a wall defining an aperture, and the movable member is a shaft movable through the aperture, the sealing ring being normally oversize at its inner radial periphery, whereby the said axial pressure decreases the said radial periphery of the sealing ring to bring it into working engagement with the shaft.

9. A gland seal assembly according to claim 7 wherein the axial length of the housing is less than the normal axial length of the rings.

10. A gland seal assembly as claimed in claim 1 wherein the said three rings are bonded together to form a unitary assembly.

* * * * *